United States Patent
Ormond

[15] 3,680,372
[45] Aug. 1, 1972

[54] RHOMBIC SHEAR PLATE GAGE LOAD ELEMENT

[72] Inventor: Alfred Newman Ormond, 11969 E. Rivera Rd., Santa Fe Springs, Calif. 90670

[22] Filed: April 27, 1970
[21] Appl. No.: 32,303

[52] U.S. Cl. .................................. 73/141 A, 338/5
[51] Int. Cl. .................................. G01l 1/22
[58] Field of Search .............. 73/141 A, 133, 88.5; 338/2–5

[56] References Cited

UNITED STATES PATENTS

| | | | |
|---|---|---|---|
| 3,376,537 | 4/1968 | Pugnaire | 73/141 A |
| 2,986,931 | 6/1961 | Ormond | 73/141 A |
| 2,520,923 | 9/1950 | Franzel | 73/141 A |
| 2,550,588 | 4/1951 | Oberholtzer | 73/141 A |
| 3,447,367 | 6/1969 | Taylor | 73/141 A |
| 3,386,282 | 6/1968 | Jacobson | 73/88.5 |
| 3,303,450 | 2/1967 | Brackett | 388/2 |
| 2,796,503 | 6/1957 | Ward | 338/5 |
| 2,998,584 | 8/1961 | Statham | 338/4 |
| 3,330,154 | 7/1967 | Halbern | 73/143 |
| 3,438,494 | 4/1969 | Fukunaga | 73/88.5 |

*Primary Examiner*—Charles A. Ruehl
*Attorney*—Pastoriza & Kelly

[57] ABSTRACT

An improved strain gage load cell or element comprises a rhombic member completely surrounding a shear plate with the plane of the shear plate lying in the plane of the rhombic member. The arms of the rhombic member are integrally formed to the edges of the shear plate so that a force applied to opposite vertices of the rhombic member in the direction of the diagonal between the vertices establishes tension and compression strains in the shear plate. These tension and compression strains may be detected by suitable strain gage means to provide an output signal indicative of the applied forces.

10 Claims, 6 Drawing Figures

PATENTED AUG 1 1972

3,680,372

INVENTOR.
ALFRED N. ORMOND
BY Pastoriza & Kelly
ATTORNEYS

RHOMBIC SHEAR PLATE GAGE LOAD ELEMENT

This invention relates generally to force measuring devices and more particularly to a strain gage load element structured to define a rhombic member surrounding a shear plate in such a manner that the electrical output of strain gages secured to the shear plate is substantially greater than that afforded for equal stress applied to conventional column type load cells.

BACKGROUND OF THE INVENTION

It is common practice to utilize load cells to which strain gages are attached for measuring forces. One well known type of such load cell particularly useful for measuring a force along a given direction takes the form of a column of solid metal which may be cylindrically shaped, the axis of the cylinder coinciding with the direction of the particular force to be measured. First and second sets of strain gages may be secured to appropriate surface portions of the cylindrical load cell with their sensitive axes at right angles to each other, the axes of one set preferably being parallel to the axis of the cylindrical load cell.

With the foregoing arrangement, if a compressive force is applied to the ends of the column in the axial direction of the column, those strain gages with their strain sensitive axes parallel to the axis of the column will be placed in compression and the other set of strain gages will be placed in tension. If the load applied to the cell is in the opposite direction; that is, a tension load, the first set of strain gages with their axes parallel to the axis of the load cell will be placed in tension and the other set of strain gages will be placed in compression. The two sets of strain gages may be properly connected into the arms of an electrical bridge to provide an output signal indicative of the applied force to the load cell.

The efficacy or sensitivity of a load cell of the foregoing described type can be measured in terms of the voltage output per unit of force applied to the cell. Clearly, the greater the voltage output per unit force applied to the cell the more sensitive will be the cell and the more accurate can measurements be effected.

BRIEF DESCRIPTION OF THE PRESENT INVENTION

With the above considerations in mind, a primary purpose of the present invention is to provide an improved load cell geometry or construction such that when said strain gages are properly attached thereto a substantially greater output signal per unit force applied to the load cell results as compared to the known column type of cell at substantially the same stress level.

Briefly, the foregoing greater sensitivity is realized by providing a load element comprising a rhombic member and an imperforate shear plate surrounded by the rhombic member with the rhombic member in contiguous connected engagement along major portions of the adjacent edges of the shear plate. The shear plate itself is coplanar with the rhombic member and in the preferred embodiment, the inside of the arms of the rhombic member contiguously engage the entire perimeter of the shear plate so that an integral load element or cell results.

With the foregoing arrangement, when a force is applied to opposite vertices of the rhombic member, the force in question is transmitted to the shear plate through the arms of the rhombic member so that tension and compression strains are simultaneously established in the shear plate. If suitable sets of strain gages are properly secured to the surface of the shear plate with their sensitive axes respectively aligned with the diagonals of the rhombic, and these strain gages properly connected into the conventional electrical bridge circuit, an output signal of almost twice that realizable by a conventional column type of load cell working at the same stress level, is obtained.

BRIEF DESCRIPTION OF THE DRAWINGS

A better understanding of the invention will be had by referring to the accompanying drawings, in which.

DETAILED DESCRIPTION OF THE PREFERRED EMBODIMENT

Figure 1:
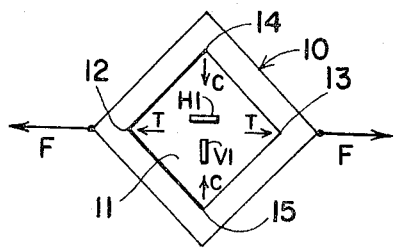
FIG. 1 is a schematic side elevational view of a rhombic shear plate strain gage load element in accord with the present invention.

Referring first to FIG. 1, there is schematically illustrated a rhombic member 10 and a shear plate 111 surrounded by the rhombic member. In the embodiment shown, the inside surfaces of the arms of the rhombic member 10 are in physical contiguous engagement with the periphery of the shear plate; that is, the structure is integral. It is only essential, however, that major portions of the rhombic member between the vertices 12, 13, 14, and 15 be connected to the adjacent perimeter portions of the shear plate 11.

With the foregoing arrangement, if a force F is applied to opposite vertices of the rhombic member in the direction indicated by the arrows, this force will be transmitted to the shear plate 11 through the arms of the rhombic member to thereby establish tension and compression strains in the shear plate. These strains are indicated by the small arrows T and C respectfully. If the force F applied to the rhombic member is reversed in direction; that is, constitutes a compressive force, then the tension and compression strains established in the shear plate will be reversed; that is, the arrows indicated by the letter C will be reversed in direction and will constitute tension strains and the arrows indicated by the letter T will be reversed in direction and will constitute compression strains.

If suitable first and second strain gage means H1 and V1 are disposed on one surface with their sensitive axes aligned with the diagonals of the rhombic member 10 respectively, and similar strain gages H2 and V2 disposed on the opposite surface (not shown), an electrical output signal may be provided indicative of the force F applied.

Figure 2:
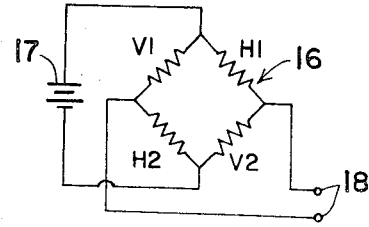
FIG. 2 is a schematic circuit diagram of an electrical bridge for providing an output from strain gage elements incorporated in the system of FIG. 1.

Thus, referring to FIG. 2 there is shown a conventional strain gage bridge 16 incorporating the strain gages for measuring tension and compression strains as indicated by the letters H1, H2, and V1, V2 designating the arms of the bridge. Voltage to diagonally opposite input points on the bridge is provided by battery 17 and the output is taken from the other two diagonally opposite points of the bridge to output terminal 18.

Because of the unique rhombic-shear plate combination strain gage load element as described in FIG. 1, an output of almost two times as great per unit value of force can be provided over that which would result with a conventional column type load cell working at the same stress level. The reason for this increased output is simply the transmission of force to the shear plate by means of the rhombic configuration surrounding the shear plate. For example, in the absence of the rhombic member 10, if tension forces were merely applied to two of the diagonally opposite corners of the shear plate itself, the tension strain gages H1 and H2 would provide an output signal and there would also be provided some compression strain in the vertical direction as a consequence of the tendency of the shear plate to elongate in an horizontal direction due to Poisson's ratio. This compression strain would be substantially less than that provided by the addition of the rhombic member 10 wherein the arms between the four vertices of the rhombic member transfer positive forces to the shear plate so that a condition of pure shear is created in the plate.

Part of the load created by the force F will, of course, be carried by the rhombic member. However, the major portion of this load will be transferred through the rhombic member directly to the shear plate to establish the tension and compression strains as described.

Figure 3:
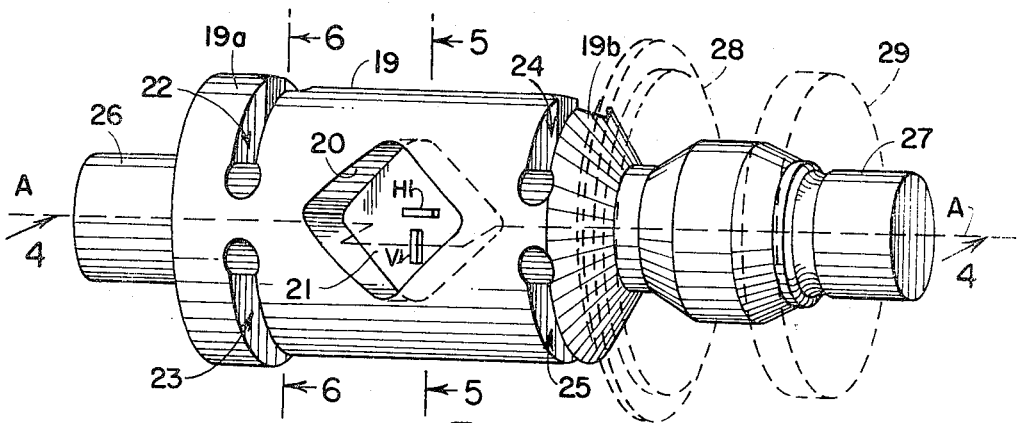
FIG. 3 is a perspective view of an actual embodiment of a load cell constructed in accord with the principles of the invention shown in FIG. 1.

Referring now to FIG. 3 there is illustrated a practical embodiment of the load cell operating under the principles described in conjunction with FIGS. 1 and 2. As shown, this load element includes an integral block 19 which may be of cylindrical shape having cut-outs 20 in opposite sides which terminate short of the center of the body or block 19 to define a central shear plate 21. The side material of the cylindrical block 19 outlining the cut-outs essentially defines a rhombic member integral with and surrounding the shear plate.

Figure 4:
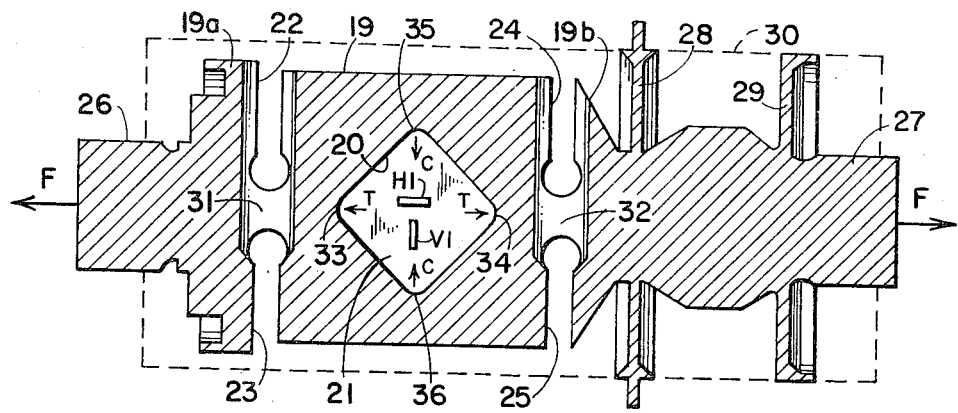
FIG. 4 is a cross section taken in the direction of the arrows 4—4 of FIG. 3.

With reference to both FIGS. 3 and 4 together, the block member 19 includes saw cuts 22 and 23 extending in from opposite sides adjacent to the left end portion of the block and saw cuts 24 and 25 extending inwardly from opposite sides adjacent to the right hand portion of the block. These saw cuts terminate short of the center of the block 19 leaving essentially flexure webs in planes at 90° to the plane of the shear plate and also serving to define end portions 19a and 19b. Forces to be measured by the load element are applied to end projecting portions 26 and 27 integrally formed with the end portions 19a and 19b as shown. Such force to be measured would be applied axially; that is, in the direction of the axis A—A of the cylindrical body 19. From FIG. 4, it will be evident that such force designated by the letter F will be in alignment with a diagonal of the rhombic defined by the cut-out 20.

As shown in phantom lines in FIG. 3 and full cross section in FIG. 4, there may be provided a pair of diaphragms 28 and 29 secured to the end portion 19b between its connection to the intermediate portion of the block 19 and the projecting force applying end 27. These diaphragms cooperate with the left end portion 19a to support a cylindrical casing surrounding the load element as indicated by the dashed line 30.

It will be noted in the cross section of FIG. 4 that a vertical bore extends along the saw cuts 22 and 24 to sever the remaining flexure web between the end portions and intermediate portiond of the body 19 as indicated at 31 and 32 thereby placing the oppositely inwardly extending saw cuts in communication with each other. The bores defining this structure are not essential but will provide some improvement in load transfer. Essentially the flexure webs transmit the axial force of F to the intermediate body portion 19 which functions as a rhombic member transferring the load through the arms defined between the vertices 33, 34, and 35, 36 to shear plate 21.

Figure 5:
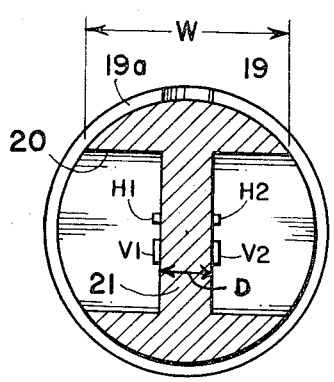
FIG. 5 is a cross section taken in the direction Of the arrows 5—5 of FIG. 3.

Referring now to the cross-section of FIG. 5, it will be noted that the depth of each of the cut-outs 20 is at least as great as the thickness of the shear plate 21 designated D. Stated differently, the overall thickness of arms of the rhombic member defined by the portion of the block 19 outlining the cut-outs and designated W are preferably at least twice the thickness D of the shear plate. The result is that when the load element is viewed in cross-section taken normal to the plane of the shear plate, the cross section effectively defines an I beam structure such that the load element is substantially insensitive to bending moments in any direction normal to the direction of the axial force applied to the load element.

Figure 6:
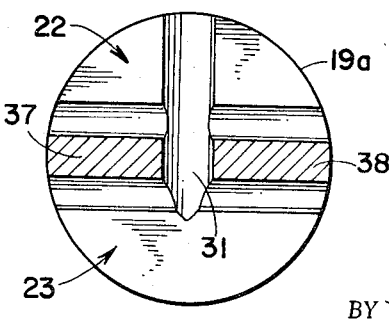
FIG. 6 is a cross section taken in the direction of the arrows 6—6 of FIG. 3.

FIG. 6 illustrates a cross section taken between the left end portion 19a and intermediate portion 19 of the block. In this view, it will be evident that the termination of the saw cuts 22 and 23 short of the central portion of the block results in the provision of a flexure web. As described in conjunction with FIG. 4, this web is preferably cut by a hole 31 extending through the saw cut 22. The flexure web is thus divided at this point as indicated at 37 and 38 thereby providing an improved path for load transfer.

OPERATION

The operation of the load element described in FIGS. 3, 4, 5, and 6 is the same as that described for the shematic showing of FIGS. 1 and 2. Thus, suitable first and second strain gage means such as indicated by the letters H1, V1 and H2, V2 are secured to opposite surfaces of the shear plate 21 with their strain sensitive axes aligned with the diagonals of the rhombic member defined by the intermediate block portion 19 outlining the cut-outs 20. If a tension force F is now applied to the projecting ends 26 and 27 as indicated by the arrows F in FIG. 4, such force will be transmitted through the split flexure webs 37 and 38 described in FIG. 6 to the intermediate rhombic member 19 and thence to the shear plate 21. As in the case of the showing of FIG. 1, there will thus be established in the shear plate tension and compression strains respectively. These strains are indicated by the arrows marked T and C in FIG. 4 and will be detected by the strain gage means H1, H2 and V1, V2 respectively.

By connecting the strain gages as shown in FIG. 4 in a suitable bridge circuit such as described in FIG. 2, an output voltage signal will be provided constituting a function of the force F applied to the load element.

The force applied to the rhombic is transferred to the shear web along the arms between the vertices 33, 34, 35, and 36. The resulting output electrical signal is almost twice that which would be obtained were a conventional type load element employed at the same stress level.

By making the rhombic member portion of the load element substantially thicker or of greater mass as results from the particular construction described in FIGS. 3 to 6, the resulting effective I beam configuration as viewed in cross section and described in conjunction with FIG. 5 provides not only a better load transfer but also, as mentioned, decreases the sensitivity of the load cell to bending moments. Some isolation of any extraneous forces not in axial alignment with the load element also is achieved by the flexure connection of the end portions 19a and 19b as described in conjunction with FIG. 6.

From the foregoing description, it will be evident that the present invention has provided a markedly improved load cell of greater sensitivity for a given stress level than has heretofore been available.

The term "rhombic member" as used therein and in the claims is meant to include any structural configuration functioning in a manner equivalent to a geometric rhombic member.

What is claimed is:

1. A load sensing element comprising: a rhombic member; and an imperforate shear plate surrounded by said rhombic member with the arms of said rhombic member in contiguous connected engagement with major portions of the adjacent edges of said plate whereby a load applied to said load sensing element in alignment with opposite vertices of said rhombic member is transmitted through said rhombic member with a major portion of said load being transferred by said arms to said major portions of the edges of the plate in shear to thereby establish tension and compression strains in said shear plate in the directions of said diagonals.

2. A load element according to claim 1, including strain gage means secured to said shear plate with their sensitive axes aligned with the diagonals of said rhombic member whereby an electrical indication of said tension and compression strains may be generated.

3. A load sensing element comprising: a rhombic member; and an imperforate shear plate lying in the plane of said rhombic member and surrounded by said rhombic member with the perimeter of said shear plate in complete physical contiguous engagement with the inner sides of said rhombic member, whereby a load applied to said load sensing element in alignment with opposite vertices of said rhombic member is transmitted through the arms of said rhombic member with a major portion of said load being transferred by said arms to said shear plate along its edges in shear to simultaneously establish tension and compression strains in said shear plate along the directions of the diagonals of said rhombic member respectively.

4. A load element according to claim 3, in which the thickness of the arms of said rhombic member are at least twice the thickness of said shear plate when viewed in a cross section taken normal to the plane of said rhombic member and shear plate, said cross section effectively defining an I beam structure such that the sensitivity of said load element to bending moments is decreased.

5. A load element according to claim 4, in which said rhombic member and shear plate are integral.

6. A rhombic shear plate strain gage load sensing element comprising: an integral block having cut-outs in opposite sides to define a central imperforate shear plate, the side material of said block outlining said cut-outs defining a rhombic member integral with and surrounding said shear plate, said block including end portions in axial alignment with a diagonal to said rhombic member whereby loads applied along the direction of said diagonal to said end portions are transmitted through said rhombic member with a major portion of said loads being transferred to said shear plate to simultaneously established tension and compression strains in said shear plate in the diagonal directions of said rhombic member respectively.

7. The subject matter of claim 6, in which said block includes saw cuts extending inwardly from opposite sides adjacent to said end portions, said saw cuts terminating short of the center of said block thereby defining flexure webs between said end portions and the remaining intermediate portions of said block lying in a plane at 90° to the plane of said shear plate.

8. The subject matter of claim 7, including central holes in said webs to place opposite saw cuts in open communication with each other to thereby improve the load transfer characteristics of the integral connections of said end portions with said remaining intermediate portions of said block.

9. The subject matter of claim 6, including first and second strain gage means secured to said shear plate with their sensitive axes in alignment with said diagonals of said rhombic member respectively; and electrical bridge means connected to said strain gage means for providing an output electrical signal constituting a function of the force applied to said end members in the direction of said diagonal.

10. The subject matter of claim 6, in which the depth of each of said cut-outs is at least as great as the thickness of said shear plate when viewed in cross section taken normal to the plane of said shear plate, said cross section effectively defining an I beam structure such that said load element is substantially insensitive to bending moments in any direction normal to the direction of said forces.

* * * * *